US008037605B2

(12) United States Patent
Kim et al.

(10) Patent No.: US 8,037,605 B2
(45) Date of Patent: Oct. 18, 2011

(54) PIEZOELECTRIC INKJET PRINTHEAD AND METHOD OF MANUFACTURING THE SAME

(75) Inventors: Jong-beom Kim, Yongin-si (KR); Jae-chang Lee, Hwaseong-si (KR)

(73) Assignee: Samsung Electro-Mechanics Co., Ltd, Suwon-Si (KR)

( * ) Notice: Subject to any disclaimer, the term of this patent is extended or adjusted under 35 U.S.C. 154(b) by 0 days.

(21) Appl. No.: 12/852,613

(22) Filed: Aug. 9, 2010

(65) Prior Publication Data

US 2010/0319195 A1 Dec. 23, 2010

Related U.S. Application Data

(62) Division of application No. 12/038,170, filed on Feb. 27, 2008, now Pat. No. 7,789,496.

(30) Foreign Application Priority Data

Oct. 19, 2007 (KR) ................................ 2007-105790

(51) Int. Cl.
*B23P 17/00* (2006.01)
*B41J 2/17* (2006.01)

(52) U.S. Cl. ........................................ 29/890.1; 347/71

(58) Field of Classification Search .................... 347/68, 347/70–72; 29/890.1, 25.35
See application file for complete search history.

(56) References Cited

U.S. PATENT DOCUMENTS

2007/0171260 A1 7/2007 Lee et al.
2007/0176979 A1 8/2007 Chung et al.
2008/0074474 A1 3/2008 Yoo et al.
2008/0309736 A1 12/2008 Wee et al.
2009/0009565 A1 1/2009 Oh et al.

FOREIGN PATENT DOCUMENTS

JP 06-956 1/1994
KR 10-2007-0078201 7/2007
KR 10-2007-0079412 8/2007

OTHER PUBLICATIONS

KR Office Action issued Jun. 24, 2011 in KR Patent Application No. 10-2007-0105790.

*Primary Examiner* — Matthew Luu
*Assistant Examiner* — Lisa Solomon
(74) *Attorney, Agent, or Firm* — Stanzione & Kim, LLP

(57) ABSTRACT

Provided are a piezoelectric inkjet printhead and a method of manufacturing the same. The piezoelectric inkjet printhead includes first and second single-crystalline silicon substrates. An ink flow path is disposed in a first surface of the first substrate. The ink flow path includes an ink introduction port, a manifold for supplying ink, a plurality of pressure chambers filled with ink to be ejected, a plurality of restrictors for connecting the manifold with the plurality of pressure chambers, respectively, and a plurality of nozzles for ejecting ink. The second substrate is bonded to the first substrate to thereby complete the ink flow path. A plurality of piezoelectric actuators are disposed on a second surface of the first substrate to correspond to each of the pressure chambers and provide drivability required for ejecting ink to the respective pressure chambers. In this construction, aligning the first and second substrates is unnecessary, so that the manufacturing process can be simplified, the manufacturing cost can be reduced, and ink ejecting performance can be improved.

6 Claims, 11 Drawing Sheets

PIEZOELECTRIC INKJET PRINTHEAD AND METHOD OF MANUFACTURING THE SAME

CROSS-REFERENCE TO RELATED APPLICATIONS

This application is a divisional of prior application Ser. No. 12/038,170, filed on Feb. 27, 2008 now U.S. Pat. No. 7,789, 496, in the U.S. Patent and Trademark, which claims priority from Korean Patent Application No. 10-2007-0105790, filed on Oct. 19, 2007, in the Korean Intellectual Property Office, the disclosure of which is incorporated herein in its entirety by reference.

BACKGROUND OF THE INVENTION

1. Field of the Invention

The present invention relates to an inkjet printhead, and more particularly, to a piezoelectric inkjet printhead including two silicon substrates and a method of manufacturing the same.

2. Description of the Related Art

An inkjet printhead is an apparatus that ejects very small droplets of printing ink on a printing medium in a desired position to print an image in a predetermined color. Inkjet printheads may be largely classified into thermal-drive inkjet printheads and piezoelectric inkjet printheads. The thermal-drive inkjet printhead produces bubbles using a thermal source and ejects ink due to the expansive force of the bubbles. The piezoelectric inkjet printhead applies pressure generated by deforming a piezoelectric material to ink and ejects the ink due to the generated pressure.

In a conventional piezoelectric inkjet printhead, a manifold, a plurality of restrictors, a plurality of pressure chambers, and a plurality of nozzles form an ink flow path and are disposed in a flow path forming plate, and a plurality of piezoelectric actuators are disposed over the flow path forming plate. The manifold is a path via which ink is supplied from an ink storage to each of the pressure chambers, and each of the restrictors is a path via which ink is supplied from the manifold to the corresponding pressure chamber. The pressure chambers are filled with ink to be ejected. The volume of each of the pressure chambers is varied due to the drive of the corresponding piezoelectric actuator to cause a pressure variation required for ejecting or injecting ink.

The formation of the flow path forming plate includes forming the ink flow path by processing each of a plurality of thin substrates formed of a ceramic material, a metal material, or a synthetic resin and stacking the thin substrates. Also, each of the piezoelectric actuators is formed over the pressure chamber by stacking a piezoelectric layer and an electrode for applying a voltage to the piezoelectric layer. Thus, a portion of the flow path forming plate, which forms a top wall of the pressure chamber, functions as a vibrating plate.

Operation of the conventional piezoelectric inkjet printhead having the above-described construction will now be described. When the vibrating plate is deformed due to the drive of the piezoelectric actuator, the volume of the pressure chamber is reduced, so that ink is externally ejected from the pressure chamber via nozzles due to a pressure variation of the pressure chamber. Thereafter, when the vibrating plate is restored to its original shape due to the drive of the piezoelectric actuator, the volume of the pressure chamber is increased, so that ink is supplied from the manifold through the restrictor into the pressure chamber due to a pressure variation.

As described above, since the conventional inkjet printhead is manufactured by stacking a plurality of substrates, a manufacturing process is complicated and a process of stacking a plurality of substrates leads to the occurrence of alignment errors.

SUMMARY OF THE INVENTION

The present invention provides a piezoelectric inkjet printhead, which is manufactured using two silicon substrates so as to simplify the manufacturing process and improve ink ejecting performance, and a method of manufacturing the piezoelectric inkjet printhead.

According to an aspect of the present invention, there is provided a piezoelectric inkjet printhead including: a first substrate having an ink flow path disposed in a first surface of the first substrate, the ink flow path comprising an ink introduction port via which ink is introduced, a manifold connected to the ink introduction port and for allowing ink to flow from the ink introduction port therethrough, a plurality of pressure chambers filled with ink to be ejected, a plurality of restrictors for connecting the manifold with the plurality of pressure chambers, respectively, and for supplying ink from the manifold to the respective pressure chambers, and a plurality of nozzles connected to the pressure chambers, respectively, and for ejecting ink from the respective pressure chambers; a plurality of piezoelectric actuators disposed on a second surface of the first substrate to correspond to each of the pressure chambers and for providing drivability required for ejecting ink to the respective pressure chambers; and a second substrate bonded to the first substrate to thereby complete the ink flow path.

The nozzles may be opened through a lateral surface of the first substrate. Also, the manifold may have a longish shape in a predetermined direction, the ink introduction port may be formed on a first side of the manifold, and the pressure chambers are arranged in a row on a second side of the manifold. The ink introduction port may be formed in a lengthwise direction of the manifold such that ink is supplied through the entire lateral surface of the manifold.

The first substrate may be a silicon-on-insulator (SOI) wafer that includes a first silicon layer, an intermediate oxide layer, and a second silicon layer that are stacked sequentially. In this case, the manifold and the pressure chambers may be disposed in the first silicon layer, and the second silicon layer may function as a vibrating plate that is deformed due to the drive of the piezoelectric actuators. The depth of the pressure chambers and the depth of the manifold may be substantially equal to the thickness of the first silicon layer.

The width of the restrictors may gradually increase towards the pressure chambers and away from the manifold. The depth of the restrictors may be equal to or smaller than the depth of the manifold.

Each of the piezoelectric actuators may include: a lower electrode disposed on the first substrate; a piezoelectric layer disposed on the lower electrode over the pressure chambers; and an upper electrode disposed on the piezoelectric layer to apply a voltage to the piezoelectric layer. The lower electrode may include a titanium (Ti) thin layer and a platinum (Pt) thin layer.

A silicon oxide layer may be disposed between the first substrate and the lower electrode and function as an insulating layer.

The ink introduction port may be vertically formed through the first substrate and connected to the manifold. The ink introduction port may include a plurality of holes that are vertically formed through the first substrate.

According to another aspect of the present invention, there is provided a method of manufacturing a piezoelectric inkjet printhead. The method includes: preparing a first substrate and a second substrate, each substrate formed of single-crystalline silicon; processing a first surface of the first substrate to form an ink introduction port via which ink is introduced, a manifold connected to the ink introduction port, and a plurality of pressure chambers filled with ink to be ejected; processing the first substrate having the manifold and the pressure chambers to form a plurality of restrictors for connecting the manifold with the pressure chambers, respectively, and a plurality of nozzles for ejecting ink; stacking the first substrate on the second substrate to bond the first and second substrates to each other; and forming a plurality of piezoelectric actuators on the first substrate to correspond to the pressure chambers, respectively, the piezoelectric actuators for providing drivability required for ejecting ink.

According to yet another aspect of the present invention, there is provided a method of manufacturing a piezoelectric inkjet printhead. The method includes: preparing a first substrate and a second substrate, each substrate formed of single-crystalline silicon; vertically forming a plurality of holes through the first substrate to form an ink introduction port; processing the first substrate having the ink introduction port to form a manifold connected to the ink introduction port and a plurality of pressure chambers filled with ink to be ejected; processing the first substrate having the manifold and the pressure chambers to form a plurality of restrictors for connecting the manifold with the pressure chambers, respectively, and a plurality of nozzles for ejecting ink; stacking the first substrate on the second substrate to bond the first and second substrates to each other; and forming a plurality of piezoelectric actuators on the first substrate to correspond to the pressure chambers, respectively, the piezoelectric actuators for providing drivability required for ejecting ink.

The first substrate may be a SOI wafer that includes a first silicon layer, an intermediate oxide layer, and a second silicon layer that are stacked sequentially.

During the processing of the first substrate, the pressure chambers and the manifold may be formed by etching the first silicon layer using the intermediate oxide layer as an etch stop layer.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE PREFERRED EMBODIMENTS

Figure 1:
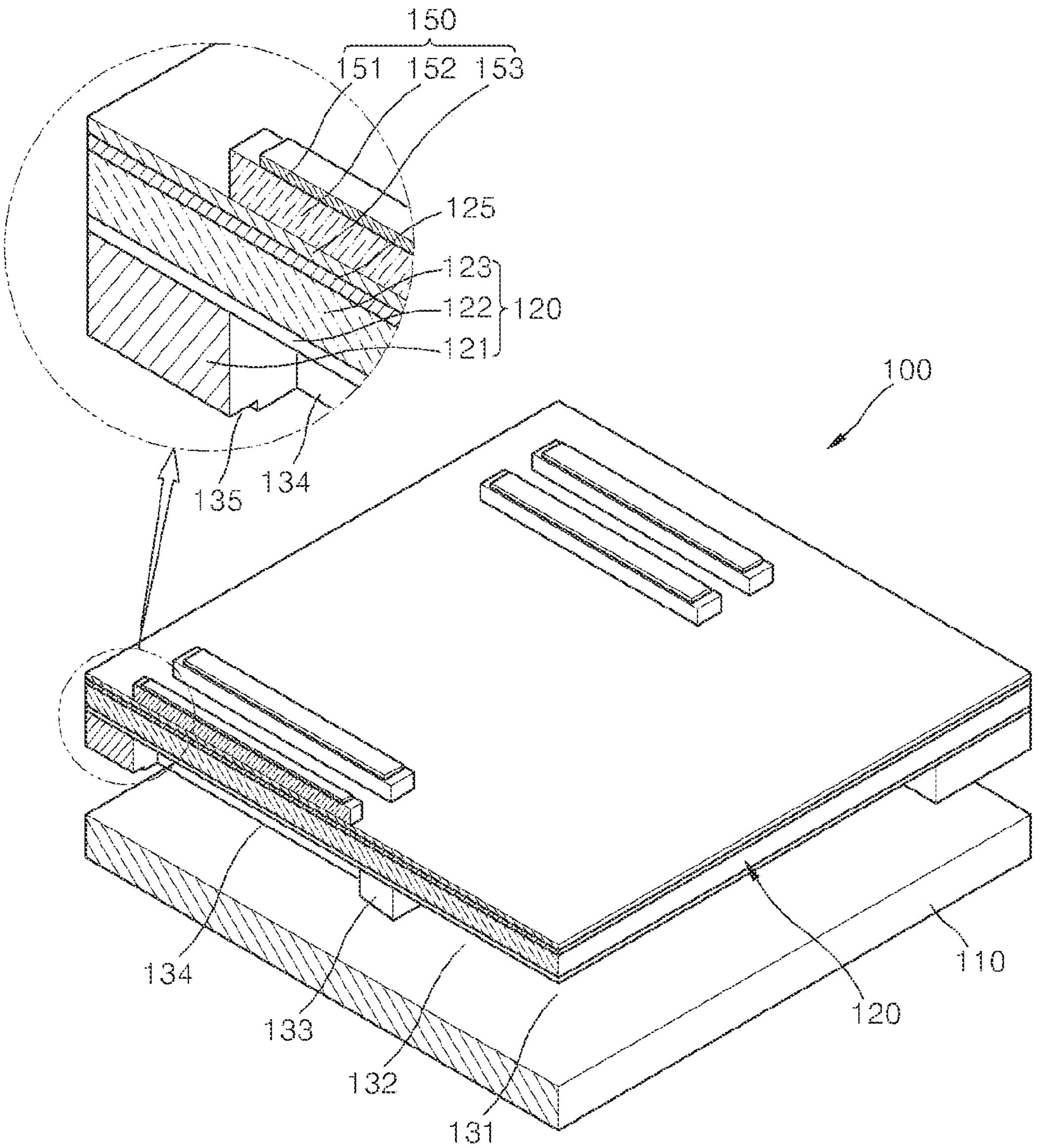
FIG. 1 is a partial cut-away perspective view of a piezoelectric inkjet printhead according to an embodiment of the present invention.

The present invention will be described more fully hereinafter with reference to the accompanying drawings, in which exemplary embodiments of the invention are shown. The same reference numerals are used to denote the same elements throughout the specification. In the drawings, the thicknesses of layers and regions are exaggerated for clarity. It will also be understood that when a layer is referred to as being "on" another layer or substrate, it can be directly on the other layer or substrate or intervening layers may also be present.

Figure 2A:
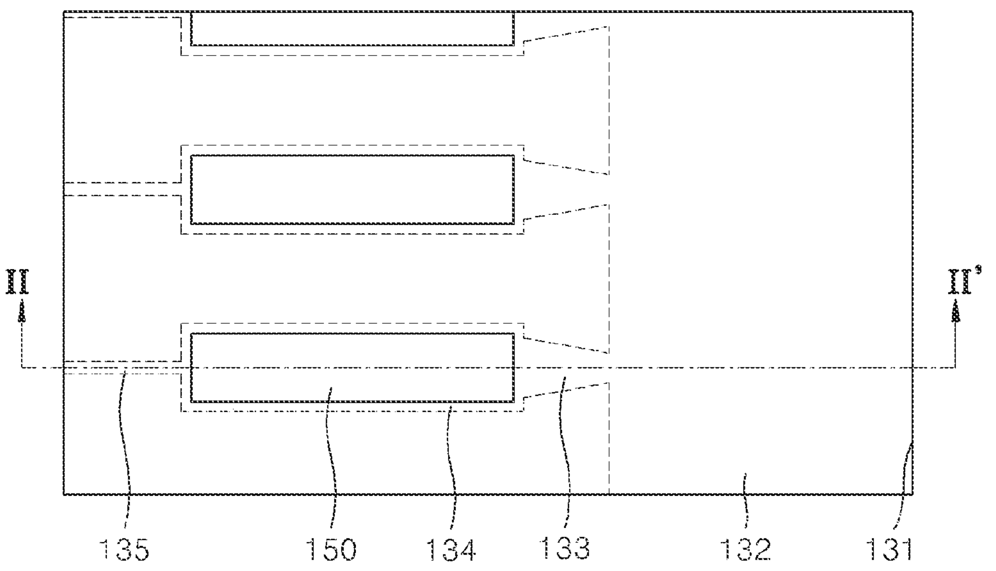
FIG. 2A is a plan view of a portion of the piezoelectric inkjet printhead shown in FIG. 1.
Figure 2B:
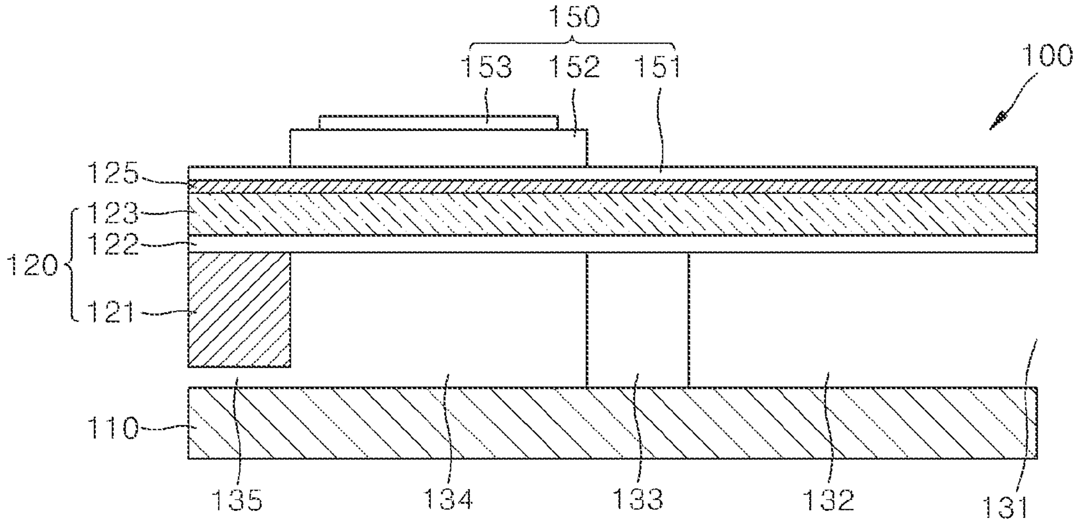
FIG. 2B is a cross-sectional view taken along a line II-II' of FIG. 2A.

FIG. 1 is a partial cut-away perspective view of a piezoelectric inkjet printhead 100 according to an embodiment of the present invention, FIG. 2A is a plan view of a portion of the piezoelectric inkjet printhead shown in FIG. 1, and FIG. 2B is a cross-sectional view taken along a line II-II' of FIG. 2A.

Referring to FIGS. 1, 2A, and 2B, the piezoelectric inkjet printhead 100 is formed by bonding first and second substrates 120 and 110. Also, an ink flow path is formed in the first substrate 120, and a plurality of piezoelectric actuators 150 are disposed on the first substrate 120 to generate drivability for ejecting ink.

The ink flow path includes an ink introduction port 131, a plurality of pressure chambers 134, a manifold 132, a plurality of restrictors 133, and a plurality of nozzles 135. The ink introduction port 131 is a port via which ink is introduced from an ink storage (not shown). The pressure chambers 134 are filled with ink to be ejected and cause pressure variations required for ejected ink. The manifold 132 is a common flow path via which ink is supplied via the ink introduction port 131 to a plurality of pressure chambers 134. The restrictors 133 are separate flow paths via which ink is supplied from the manifold 132 to the respective pressure chambers 134. The nozzles 135 allow ink to be ejected from the respective pressure chambers 134 therethrough.

Both the first and second substrates 120 and 110 may be single-crystalline silicon (Si) wafers. Thus, a desired ink flow path may be easily formed to a finer size using micromachining technology, such as a photolithography process and an etching process. In particular, the first substrate 120 may be a silicon-on-insulator (SOI) wafer. The SOI wafer may include a first Si layer 121, an intermediate oxide layer 122 disposed on the first Si layer 121, and a second Si layer 123 disposed on the intermediate oxide layer 122 that are stacked sequentially. The first Si layer 121, which is formed of single-crystalline Si, has a thickness of about several tens μm to several hundreds of μm. The intermediate oxide layer 122 can be formed by oxidizing the surface of the first Si layer 121 and may have a thickness of about 1-2 μm. Also, the second Si layer 123, which is formed of single-crystalline Si, has a thickness of about several μm to several tens of μm.

The SOI wafer is used as the first substrate 120 because the height of the pressure chamber 134 can be precisely controlled. That is, since the intermediate oxide layer 122 of the SOI wafer functions as an etch stop layer, the height of the pressure chamber 134 can be controlled by adjusting the thickness of the first Si layer 121. Also, the second Si layer 123 forms a ceiling of the pressure chamber 134 and functions as a vibrating plate, which is bent by the piezoelectric actuator 150 and varies the volume of the pressure chamber 134. Thus, the thickness of the vibrating plate is determined by the thickness of the second Si layer 123 as will be described in detail later.

The manifold 132 with a longish shape and a predetermined depth is formed on one surface of the first substrate 120. The ink introduction port 131 via which ink is supplied from the ink storage to the manifold 132 is disposed on a first side of the manifold 132 to a depth equal to or smaller than the manifold 132. In particular, the ink introduction port 131 may be longish in a lengthwise direction of the manifold 132. Due to the long shape of the ink introduction port 131, ink can be supplied more uniformly from the ink storage through the entire lateral surface of the manifold 132 to the respective pressure chambers 134.

A plurality of pressure chambers 134, each having a long rectangular parallelepiped shape, is arranged in a row on a second side of the manifold 132. The restrictors 133, which are separate flow paths, are connected between the manifold 132 and first end portions of the pressure chambers 134, respectively. The restrictors 133 have a depth equal to or smaller than the pressure chambers 134. Although FIG. 2A illustrates the restrictors 133 with a width smaller than the pressure chambers 134, the restrictors 133 may have the same width as the pressure chambers 134. As illustrated in FIG. 2A, the width of the restrictors 133 may gradually increase towards the pressure chambers 133 and away from the manifold 132.

Each of the restrictor 133 functions as a path via which ink is supplied from the manifold 132 to the corresponding pressure chamber 134. In addition, when ink is ejected, the restrictor 133 inhibits ink from flowing backward from the pressure chamber 134 to the manifold 132. In order to inhibit the backward flow of the ink, the restrictor 132 is formed such that the sectional area of the restrictor 132 is smaller than that of the pressure chamber 134 as long as a proper amount of ink is supplied to the pressure chamber 134.

The nozzles 135 for ejecting ink from the pressure chamber 134 are respectively formed to connect second end portions of the pressure chambers 134 and connected to the outside of the first substrate 120. The nozzles 135 are formed to a relatively small depth on a bottom surface of the first substrate 120 and to a smaller width than the pressure chambers 134. Meanwhile, the second substrate 110 is processed to a desired thickness using a chemical mechanical polishing (CMP) technique and bonded to the first substrate 120 having an ink flow path using a silicon direct bonding (SDB) technique, thereby completing the manufacture of the inkjet printhead 100. In the inkjet printhead 100 according to the present embodiment, all the components, which form the ink flow path, are disposed in the first substrate 120.

Thereafter, the piezoelectric actuators 150 are formed on the first substrate 120 having the ink flow path. Specifically, an insulating layer 125 is formed on a top surface of the first substrate 120. The insulating layer 125 may be a silicon oxide layer. The insulating layer 124 electrically insulates the piezoelectric actuators 150 from the first substrate 120, inhibits inter-diffusion between the first substrate 120 and the piezoelectric actuators 150, and controls thermal stress. Each of the piezoelectric actuators 150 includes a lower electrode 151, which functions as a common electrode, a piezoelectric layer 152, which is deformed according to an applied voltage, and an upper electrode 153, which functions as a driving electrode for applying a voltage to the piezoelectric layer 152. The lower electrode 151 is formed on the entire surface of the insulating layer 125. The lower electrode 151 may include two metal thin layers, for example, a Ti layer and a Pt layer. The lower electrode 151, which includes the Ti and Pt layers, functions not only as a common electrode but also as a diffusion barrier layer that prevents inter-diffusion between the piezoelectric layer 152 and the first substrate 120. The piezoelectric layer 152 is disposed on the lower electrode 151 in a position corresponding to the pressure chamber 134. The piezoelectric layer 152 is deformed with the application of a voltage and bends the second Si layer 123 (i.e., a vibrating plate) of the first substrate 120, which forms the top wall of the pressure chamber 134. The upper electrode 153 is disposed on the piezoelectric layer 152 and applies a voltage to the piezoelectric layer 152 as described above.

In the above-described inkjet printhead 100 according to the present embodiment, ink is injected in the same direction as a direction in which ink is ejected, and the piezoelectric actuator 150 is disposed over the pressure chamber 134. Accordingly, the trapping of bubbles in the ink flow path, which may occur due to a 3D complex structure of the ink flow path during an initial ink introduction process, can be prevented, and the amount of ink used to remove bubbles from the ink flow path can be reduced. Also, ink droplets can be stably ejected by solving the asymmetric flow of ink due to the complex structure of the ink flow path.

Operation of the piezoelectric inkjet printhead 100 having the above-described structure will now be described. Ink flows from the ink storage through the ink introduction port 131 into the manifold 132. Thereafter, the ink is supplied form the manifold 132 through the restrictor 133 into the respective pressure chambers 134. Once the pressure chambers 134 are filled with the ink, a voltage is applied to the piezoelectric layer 152 through the upper electrode 153 of the piezoelectric actuator 150, thereby deforming the piezoelectric layer 152. Thus, the second Si layer 123 functioning as the vibrating plate is bent inward the pressure chamber 134. Due to the bending of the second Si layer 123, the volume of the pressure chamber 134 is reduced. As a result, an internal pressure of the pressure chamber 134 is increased so that the ink is externally ejected from the pressure chamber 134 through the nozzle 135.

Thereafter, when a voltage applied to the piezoelectric layer 152 of the piezoelectric actuator 150 is cut off, the piezoelectric layer 152 is restored to its original shape, so that the second Si layer 123 functioning as the vibrating plate is also restored to its original shape and the volume of the pressure chamber 134 increases. As a result, the pressure of the pressure chamber 134 decreases and thus, the ink is supplied from the manifold 132 through the restrictor 133 into the pressure chamber 134.

When an inkjet printhead having the same drivability as a conventional piezoelectric inkjet printhead is manufactured using the above-described new structure according to the present invention, the size of the inkjet printhead can be markedly reduced compared with the conventional piezoelectric inkjet printhead. Specifically, the conventional inkjet printhead in which ink flows in a pressure chamber in a direction perpendicular to a direction in which the ink is ejected has a width of about 19 mm, while the piezoelectric inkjet printhead according to the present invention in which ink flows in the pressure chamber in the same direction as a direction in which the ink is ejected may have a width of about 1 mm.

Figure 3:
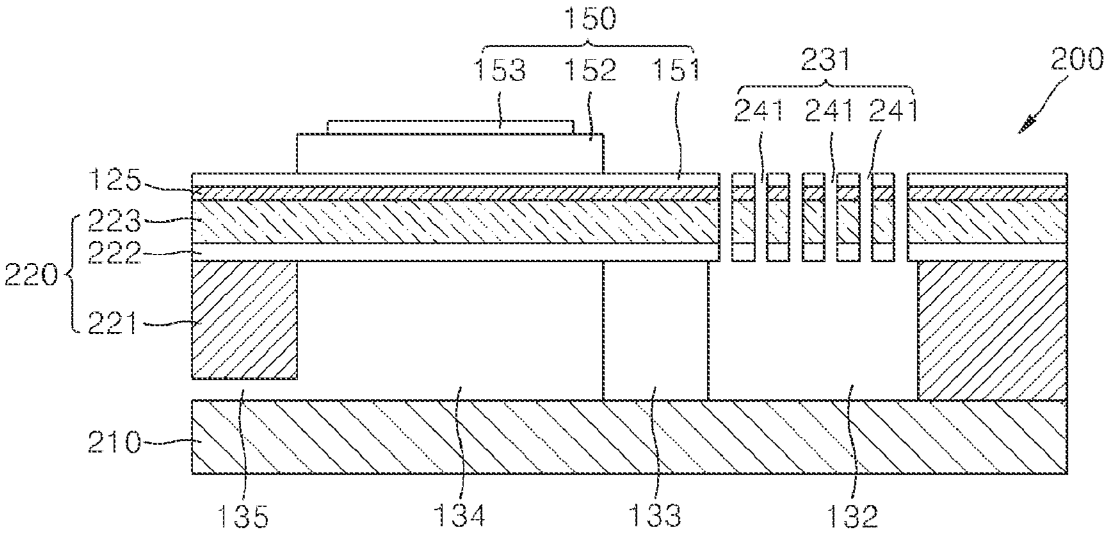
FIG. 3 is a cross-sectional view of a piezoelectric inkjet printhead according to another embodiment of the present invention.

FIG. 3 is a cross-sectional view of a piezoelectric inkjet printhead 200 according to another embodiment of the present invention.

Referring to FIG. 3, the inkjet printhead 200 has the same structure as the inkjet printhead 100 shown in FIGS. 1, 2A, and 2B except the structure of an ink introduction port 231. A first substrate 220 includes a first Si layer 221, an intermediate oxide layer 222, and a second Si layer 223, and a second substrate 210 is bonded to the first substrate 221. In the inkjet printhead 200 shown in FIG. 3, the ink introduction port 231 is vertically formed through the first substrate 220. Specifically, the ink introduction port 231 includes a plurality of holes 241, which are vertically formed through the second Si layer 223. The ink introduction port 231 having the plurality of holes 241 can filter impurities when ink flows from an ink storage (not shown) into a manifold 132. In addition, the ink introduction port 231 can suppress undulation of ink, thereby inhibiting occurrence of crosstalk.

Hereinafter, a method of manufacturing a piezoelectric inkjet printhead according to embodiments of the present invention will be described.

Initially, a method of manufacturing an inkjet printhead according to an embodiment of the present invention will be summarized. First, a first substrate having an ink flow path comprised of several components is formed. Thereafter, a second substrate is processed to a desired thickness and prepared. The second substrate is bonded to the first substrate. After that, a plurality of piezoelectric actuators is formed on the first substrate, thereby completing the manufacture of a piezoelectric inkjet printhead.

FIGS. 4A through 4F are diagrams for explaining a process of forming an ink flow path in a first substrate 320. Each of FIGS. 4A through 4F shows a cross-sectional view and a bottom view of the same process operation in order to facilitate understanding. In each of FIGS. 4A through 4F, an upper diagram is a cross-sectional view of the first substrate 320, and a lower diagram is a bottom view of the first substrate 320.

Figure 4A:
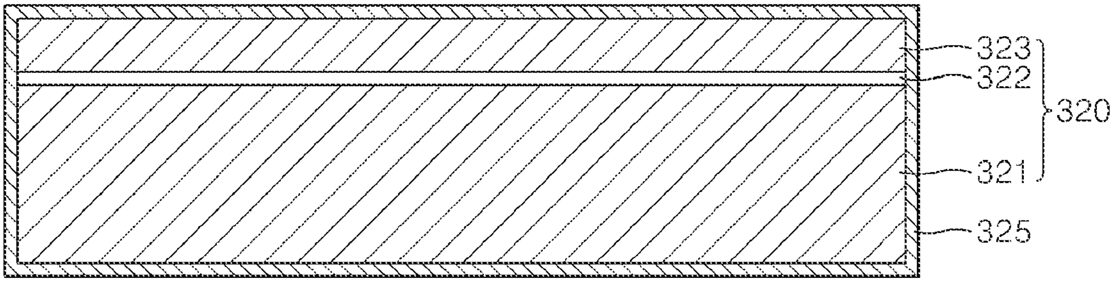
FIGS. 4A through 4F are diagrams for explaining a process of forming an ink flow path in a first substrate according to an embodiment of the present invention.
Figure 4A:
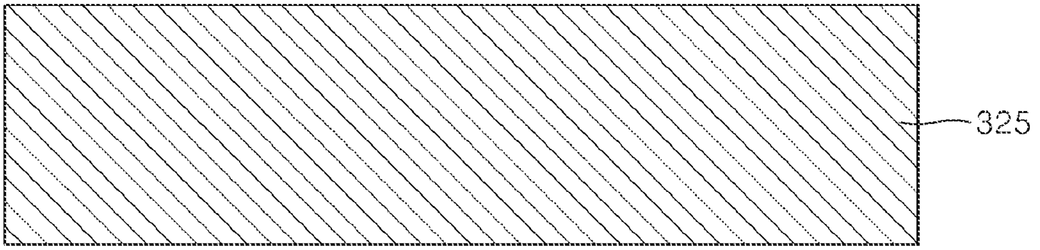

Referring to FIG. 4A, in the current embodiment, the first substrate 320 is a single-crystalline Si substrate. In this case, a Si wafer, which is widely used for the manufacture of semiconductor devices, can be employed as the first substrate 320 to facilitate the mass production of the piezoelectric inkjet printhead according to the present invention. The first substrate 320 is formed to a thickness of about 50 to 200 μm. In this case, the thickness of the first substrate 320 may be appropriately controlled according to the height of a pressure chamber. In particular, when a SOI wafer is used as the first substrate 320, the pressure chamber can be formed to a precisely desired height. As described above, the SOI wafer is formed by stacking a first Si layer 321, an intermediate oxide layer 322, and a second Si layer 323. Above all, the second Si layer 323 may be formed to a thickness of several μm to several tens of μm in order to optimize the thickness of a vibrating plate. When the first substrate 320 is loaded into an oxidation furnace and wet or dry oxidized, top and bottom surfaces of the first substrate 320 are oxidized to form a silicon oxide layer 325.

Figure 4B:
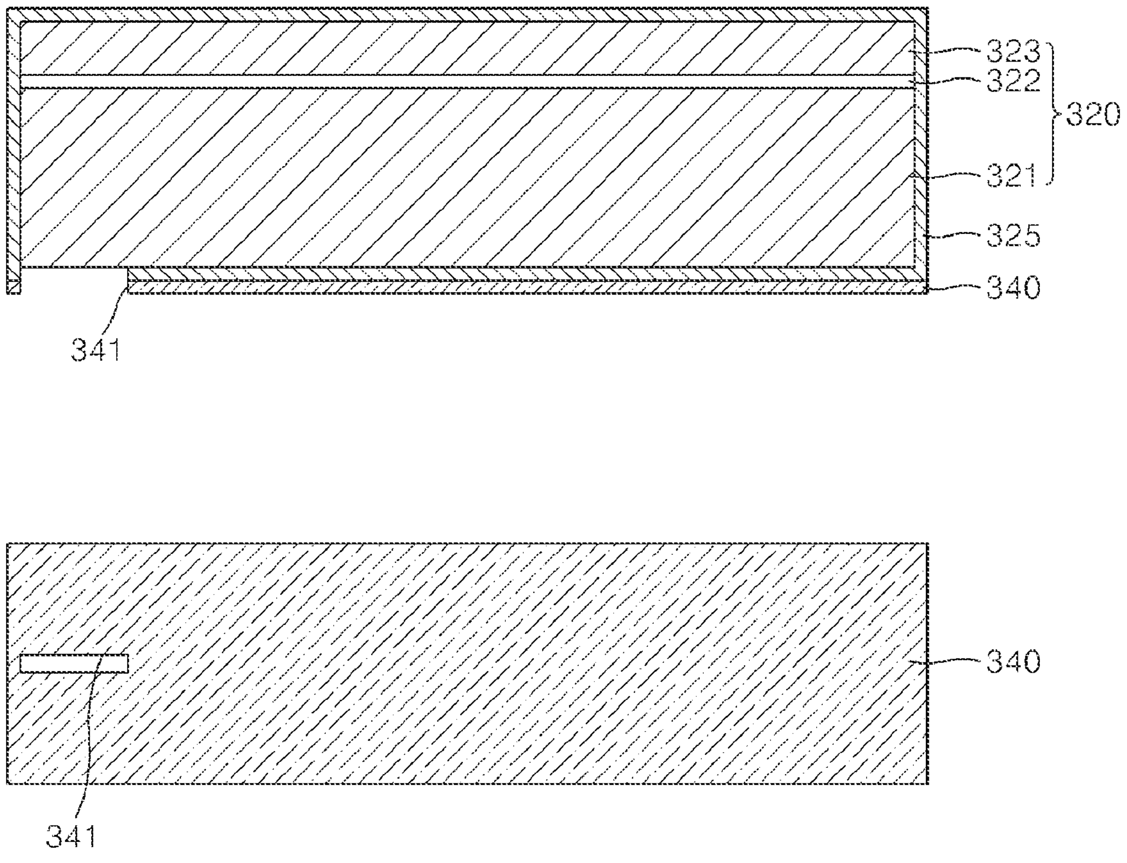

Referring to FIG. 4B, first photoresist 340 is coated on the surface of the silicon oxide layer 325 formed on the bottom surface of the first substrate 320. Thereafter, the first photoresist 340 is developed, thereby forming a first opening 341 required for forming a nozzle on the bottom surface of the first substrate 320. Thereafter, a portion of the silicon oxide layer 325, which is exposed by the first opening 341, is dry etched by, for example, a reactive ion etching (RIE) technique, using the first photoresist 340 as an etch mask. As a result, the bottom surface of the first substrate 320 is partially exposed. Meanwhile, in this case, the silicon oxide layer 325 may be wet etched. Thereafter, the remaining first photoresist 340 is removed from the silicon oxide layer 325.

Figure 4C:
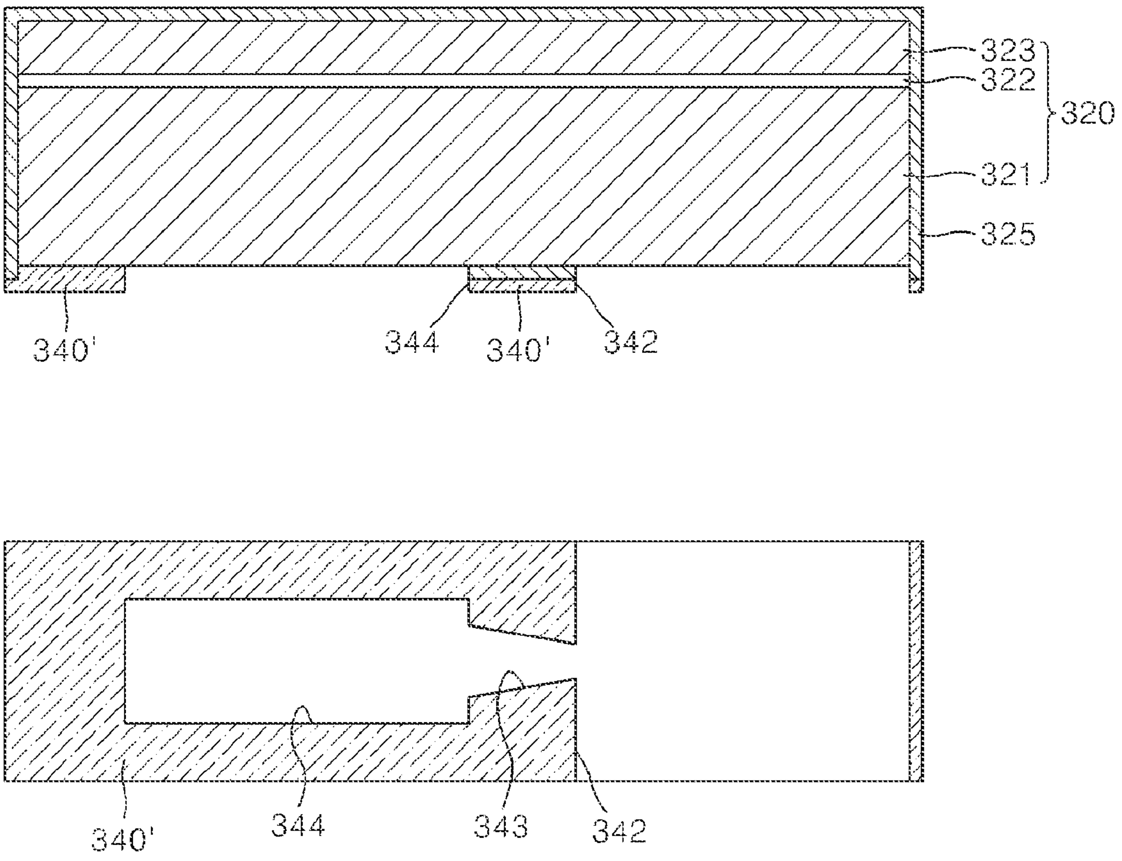

Referring to FIG. 4C, second photoresist 340' is coated on the bottom surface of the first substrate 320 exposed by the first opening 341 and on the bottom surface of the silicon oxide layer 325. After that, the coated second photoresist 340' is developed, thereby forming a second opening 342, a second opening 343, and a fourth opening 344 required for forming a manifold, a restrictor, a pressure chamber, and an ink introduction port on the bottom surface of the first substrate 320. Portions of the silicon oxide layer 325 exposed by the second, third, and fourth openings 342, 343, and 344 are dry etched by, for example, an RIE technique, using the second photoresist 340' as an etch mask, thereby partially exposing the bottom surface of the first substrate 320. In this case, the silicon oxide layer 325 may be also wet etched.

Figure 4D:
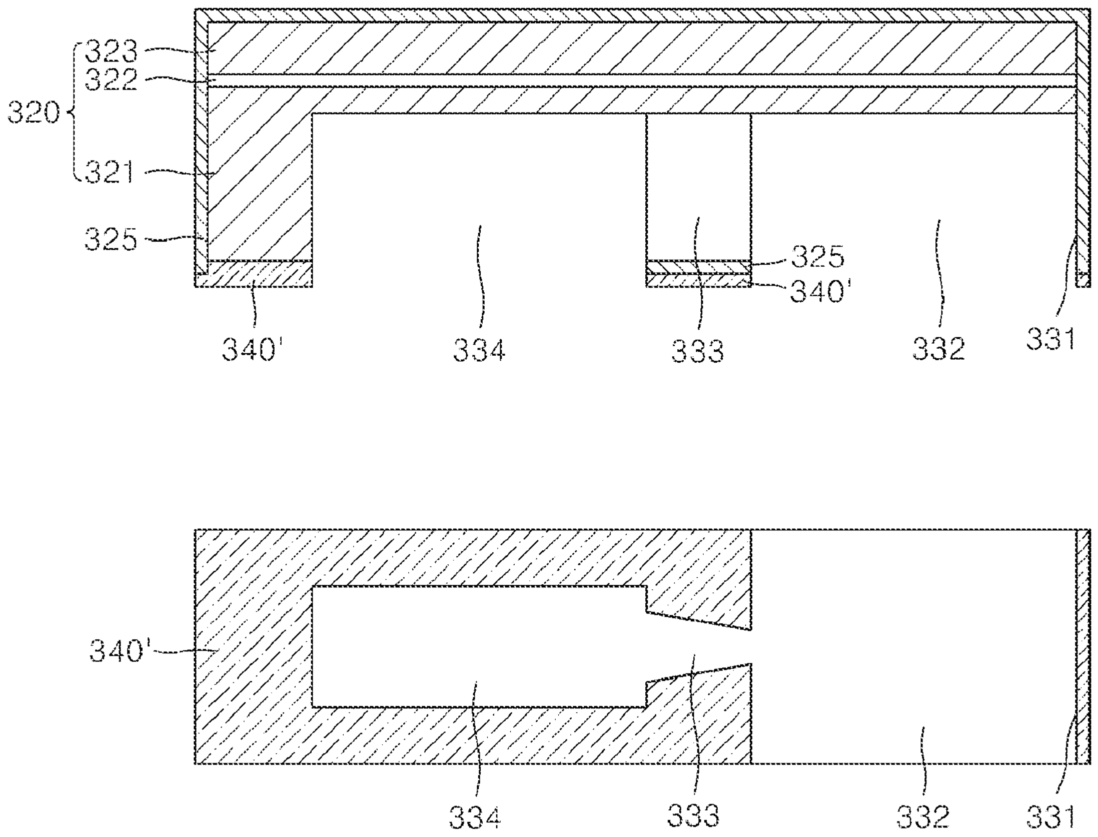
Figure 4E:
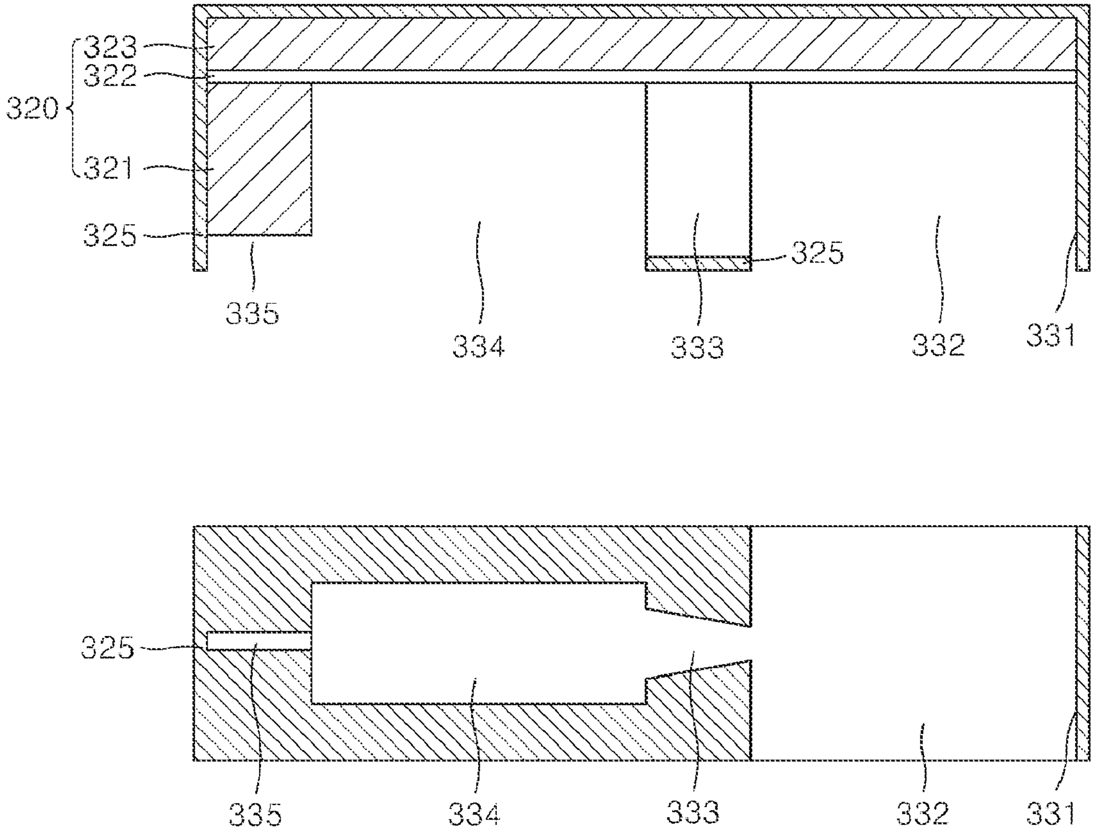

Referring to FIG. 4D, the exposed bottom surface of the first substrate 320 is etched using the second photoresist 340' as an etch mask, thereby forming a manifold 332, a restrictor 333, a pressure chamber 334, and an ink introduction port 331 to a predetermined depth. Meanwhile, in this process, the first Si layer 321 of the first substrate 320 is etched to leave a thickness corresponding to a desired depth of the nozzle. In this case, the first Si layer 321 of the first substrate 320 may be dry etched using an RIE technique or an inductively coupled plasma (ICP) technique. Subsequently, referring to FIG. 4E, the second photoresist 340' is stripped, thereby exposing a portion of the bottom surface of the first substrate 320 where a nozzle will be formed. The exposed bottom surface of the first substrate 320 is etched using the silicon oxide layer 325 as an etch mask until the intermediate oxide layer 322 is exposed. Thus, the manifold 332, the restrictor 333, the pressure chamber 334, the ink introduction port 331, and a nozzle 335 can be formed to a desired depth. When a SOI wafer is used as the first substrate 320, the intermediate oxide layer 322 of the SOI wafer functions as an etch stop layer, so that only the first Si layer 321 is etched during the current etching process. Accordingly, the pressure chamber 334 can be formed to a precisely desired height by controlling the thickness of the first Si layer 321 using a wafer polishing process.

Figure 4F:
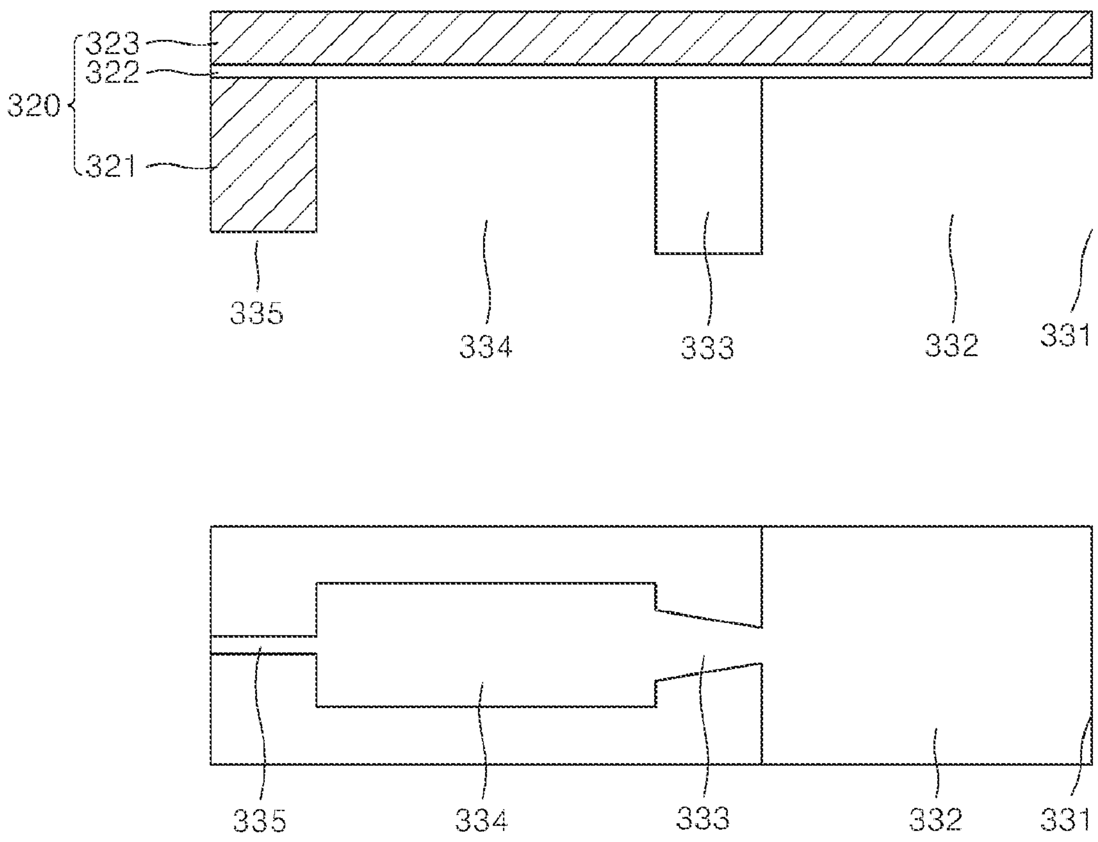

Referring to FIG. 4F, the remaining silicon oxide layer 325 is removed by etching from the first substrate 320, thereby completing the formation of the first substrate 320 with an ink flow path.

Meanwhile, the ink introduction port 331 and the nozzle 335 are opened using a dicing process that is performed after a second substrate (refer to 310 in FIG. 5D) that will be described later is bonded to the first substrate 320 having the ink flow path. In the present embodiment, after all the processes are finished, the nozzle 334 and the ink introduction port 331 are opened using the dicing process. Therefore, contamination of the ink flow path due to impurities can be prevented unlike in a conventional process in which an ink introduction port and a nozzle are opened midway through the manufacturing process.

It is described above that after the first substrate 320 is dry etched using the second photoresist 340' as an etch mask, the second photoresist 340' is stripped. However, after the second photoresist 340' is stripped, the first substrate 320 may be dry etched using the silicon oxide layer 325 as an etch mask. Specifically, when the silicon oxide layer 325 formed on the first substrate 320 is relatively thin, the first substrate 320 may be etched before the second photoresist 340' is stripped. On the other hand, when the silicon oxide layer 325 formed on the first substrate 320 is relatively thick, after the second photoresist 340' may be stripped, the first substrate 320 may be etched using the silicon oxide layer 325 as an etch mask.

Furthermore, it is illustrated and described above that the manifold 332, the restrictor 333, the pressure chamber 334, and the ink introduction port 131 are simultaneously formed in the bottom surface of the first substrate 320. However, when the manifold 332, the restrictor 333, the pressure chamber 334, and the ink introduction port 131 have different depths, they may be formed using separate processes. That is, the manifold 332, the restrictor 333, the pressure chamber 334, and the ink introduction port 131 are respectively formed by repeating the process operations described with reference to FIGS. 4B through 4D.

FIGS. 5A through 5D are diagrams for explaining a process of completing an inkjet printhead by bonding a second substrate 310 to the first substrate 320 having the ink flow path.

Figure 5A:
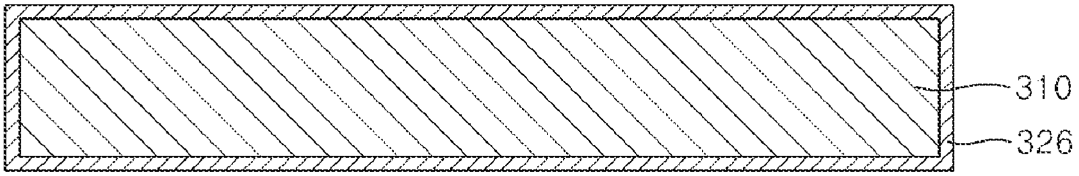
FIGS. 5A through 5D are diagrams for explaining a process of completing an inkjet printhead by bonding a first substrate and a second substrate according to an embodiment of the present invention.

Referring to FIG. 5A, the second substrate 310 is prepared. The second substrate 310 may be a single-crystalline Si substrate. In this case, a Si wafer, which is widely used for the manufacture of semiconductor devices, can be employed as the second substrate 310 to facilitate the mass production of the piezoelectric inkjet printhead according to the present invention. The second substrate 310 is loaded into an oxidation furnace and wet or dry oxidized, so that top and both surfaces of the second substrate 310 are oxidized to form a silicon oxide layer 326.

Figure 5B:
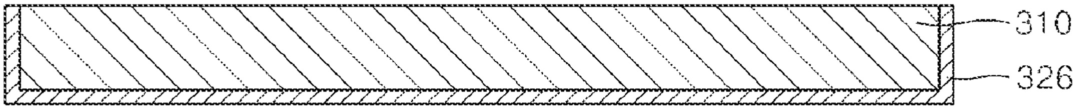

Referring to FIG. 5B, the second substrate 310 is etched to a predetermined thickness using a wafer polishing process or a chemical mechanical polishing (CMP) process. The thickness of the second substrate 310 may be appropriately controlled in the range of about 50 to 200 μm.

Figure 5C:
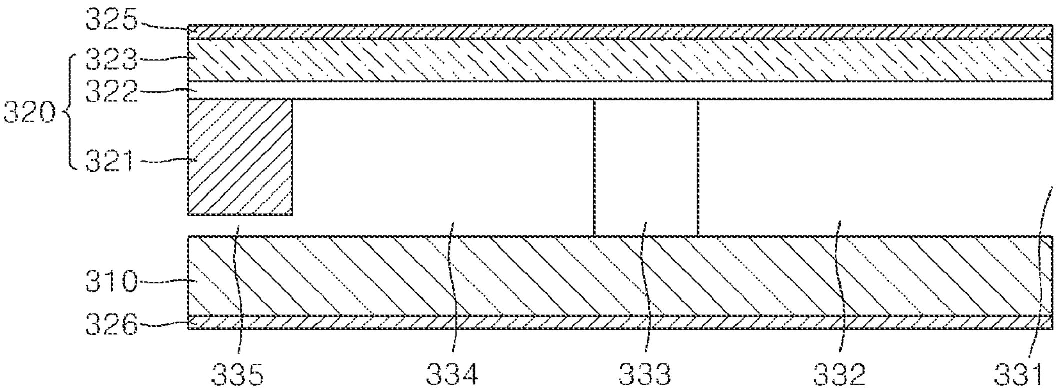

Referring to FIG. 5C, the second substrate 310 is bonded to the first substrate 320. Specifically, the second substrate 310 with a controlled thickness is bonded to the first substrate 320 having the ink flow path, which is formed using the processes described with reference to FIGS. 4A through 4F, using a known silicon direct bonding (SDB) technique. According to the SDB technique, the first and second Si substrates 320 and 310 are brought close to each other and directly bonded using thermal treatment (e.g., an annealing process) without using an adhesive. Once the first and second substrates 320 and 310 are bonded to each other, the ink flow path for allowing ink to flow therethrough is completely formed in the inkjet printhead. Specifically, a common flow path from an ink storage (not shown) through the ink introduction port 331 to the manifold 332 and separate flow paths from the manifold 332 to each of the restrictor 333, the pressure chamber 334, and the nozzle 335 are completed.

Figure 5D:
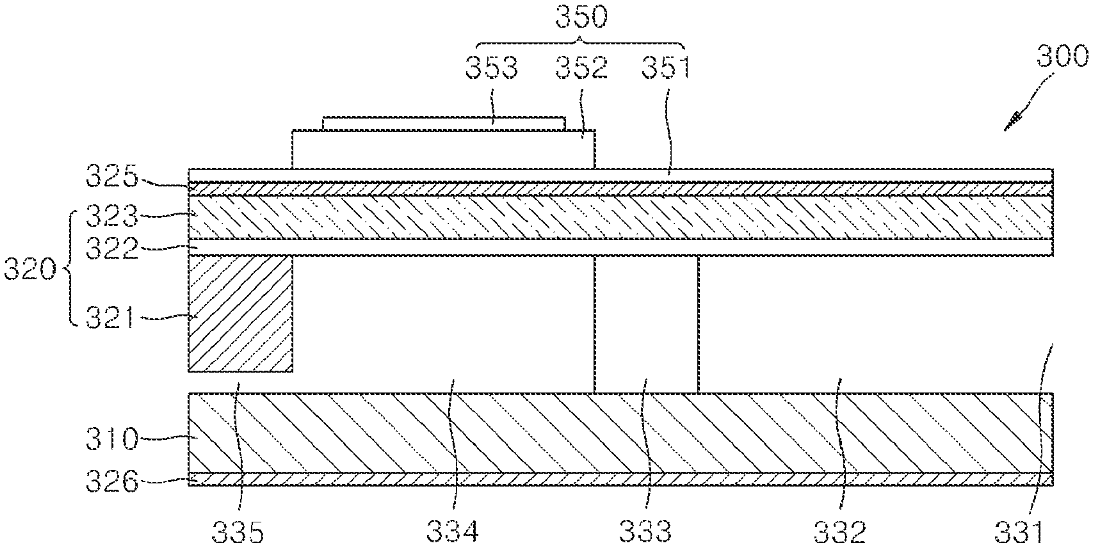

Referring to FIG. 5D, after bonding the first and second substrates 320 and 310, a plurality of piezoelectric actuators are formed on the top surface of the first substrate 320, thereby completing the manufacture of a piezoelectric inkjet printhead 300. A method of forming the piezoelectric actuators on the first substrate 320 will now be briefly described. After the second substrate 310 is bonded to the first substrate 320, an insulating layer 325, for example, a silicon oxide layer, is formed on an outer surface (i.e., a top surface) of the first substrate 320. However, the process of forming the insulating layer 325 may be omitted when an oxide layer with a sufficient thickness is already formed on the first substrate 320 using the annealing process of the foregoing SDB technique.

Thereafter, a lower electrode 351 for the piezoelectric actuators is formed on the insulating layer 325. The lower electrode 351 may include two metal thin layers, that is, a Ti layer and a Pt layer. The lower electrode 351 may be formed by sequentially depositing the Ti layer and the Pt layer on the entire surface of the insulating layer 325 using a sputtering process. The lower electrode 351 functions as a common electrode of the piezoelectric actuator.

A piezoelectric layer 352 and an upper electrode 353 are formed on the lower electrode 351. Specifically, a piezoelectric paste is coated using a screen printing technique to a predetermined thickness over the pressure chamber 334, and dried for a predetermined amount of time. The piezoelectric paste may be formed of a piezoelectric material, such as a lead zirconate titanate (PZT) ceramic material. Thereafter, an electrode material, for example, an Ag—Pd paste, is printed on the dried piezoelectric layer 352. Thereafter, the piezoelectric layer 352 is sintered at a predetermined temperature of, for example, about 900 to 1,000° C. As a result, a piezoelectric actuator 350 including the lower electrode 351, the piezoelectric layer 352, and the upper electrode 353 is formed on the first substrate 320.

Subsequently, the bonded first and second substrates 320 and 310 are diced into chips, and an electric field is applied to the piezoelectric layer 352 using a polling process to generate piezoelectric characteristics. As a consequence, the piezoelectric inkjet printhead is completed.

Meanwhile, a method of manufacturing the piezoelectric inkjet printhead 200 shown in FIG. 3 is generally the same as the method described with reference to FIGS. 4A through 4F except that an ink introduction port (refer to 231 in FIG. 3) including a plurality of holes (refer to 241 in FIG. 3) is formed before forming the first opening 341 shown in FIG. 4B. In order to form the introduction port 231, a plurality of holes 241 are vertically formed from the top surface of the first substrate 220 to the intermediate oxide layer 222 in a position corresponding to the manifold 232 that will be formed later. After forming the ink introduction port 231 through the first substrate 220, subsequent processes are performed in the same manner as described with reference to FIGS. 4B through 4F.

According to the present invention, the inkjet printhead is manufactured using only dry etching, so that the number of process operations can be reduced as compared with a conventional method using both dry and wet etching processes. Also, since an ink flow path is processed in only a single wafer, the entire process is simplified and aligning two wafers is unnecessary during an SDB process.

While the present invention has been particularly shown and described with reference to exemplary embodiments thereof, it will be understood by one of ordinary skill in the art that various changes in form and details may be made therein without departing from the spirit and scope of the present invention as defined by the following claims. For example, the above-described processes of forming respective components of a printhead are only exemplarily presented, other various etching processes may be applied, and the above-described order of process operations may be changed.

What is claimed is:

1. A method of manufacturing a piezoelectric inkjet printhead, the method comprising:

preparing a first substrate and a second substrate, each substrate formed of single-crystalline silicon;

processing a first surface of the first substrate to form an ink introduction port via which ink is introduced, a manifold connected to the ink introduction port, and a plurality of pressure chambers filled with ink to be ejected;

processing the first substrate having the manifold and the pressure chambers to form a plurality of restrictors for connecting the manifold with the pressure chambers, respectively, and a plurality of nozzles for ejecting ink;

stacking the first substrate on the second substrate to bond the first and second substrates to each other; and forming a plurality of piezoelectric actuators on the first substrate to correspond to the pressure chambers, respectively, the piezoelectric actuators for providing drivability required for ejecting ink.

2. The method of claim 1, wherein the first substrate is a silicon-on-insulator (SOI) wafer that includes a first silicon layer, an intermediate oxide layer, and a second silicon layer that are stacked sequentially.

3. The method of claim 2, wherein during the processing of the first substrate, the pressure chambers and the manifold are formed by etching the first silicon layer using the intermediate oxide layer as an etch stop layer.

4. A method of manufacturing a piezoelectric inkjet printhead, the method comprising:

preparing a first substrate and a second substrate, each substrate formed of single-crystalline silicon;

vertically forming a plurality of holes through the first substrate to form an ink introduction port;

processing the first substrate having the ink introduction port to form a manifold connected to the ink introduction port and a plurality of pressure chambers filled with ink to be ejected;

processing the first substrate having the manifold and the pressure chambers to form a plurality of restrictors for connecting the manifold with the pressure chambers, respectively, and a plurality of nozzles for ejecting ink;

stacking the first substrate on the second substrate to bond the first and second substrates to each other; and forming a plurality of piezoelectric actuators on the first substrate to correspond to the pressure chambers, respectively, the piezoelectric actuators for providing drivability required for ejecting ink.

5. The method of claim 4, wherein the first substrate is a silicon-on-insulator (SOI) wafer that includes a first silicon layer, an intermediate oxide layer, and a second silicon layer that are stacked sequentially.

6. The method of claim 5, wherein during the processing of the first substrate, the pressure chambers and the manifold are formed by etching the first silicon layer using the intermediate oxide layer as an etch stop layer.

* * * * *